F. J. SHEBESTER.
INSECT DESTROYER.
APPLICATION FILED APR. 30, 1908.

915,121.

Patented Mar. 16, 1909.
2 SHEETS—SHEET 1.

Witnesses

Inventor
Frank J. Shebester.
By C. A. Snow & Co.
Attorneys

F. J. SHEBESTER.
INSECT DESTROYER.
APPLICATION FILED APR. 30, 1908.
915,121.
Patented Mar. 16, 1909.
2 SHEETS—SHEET 2.
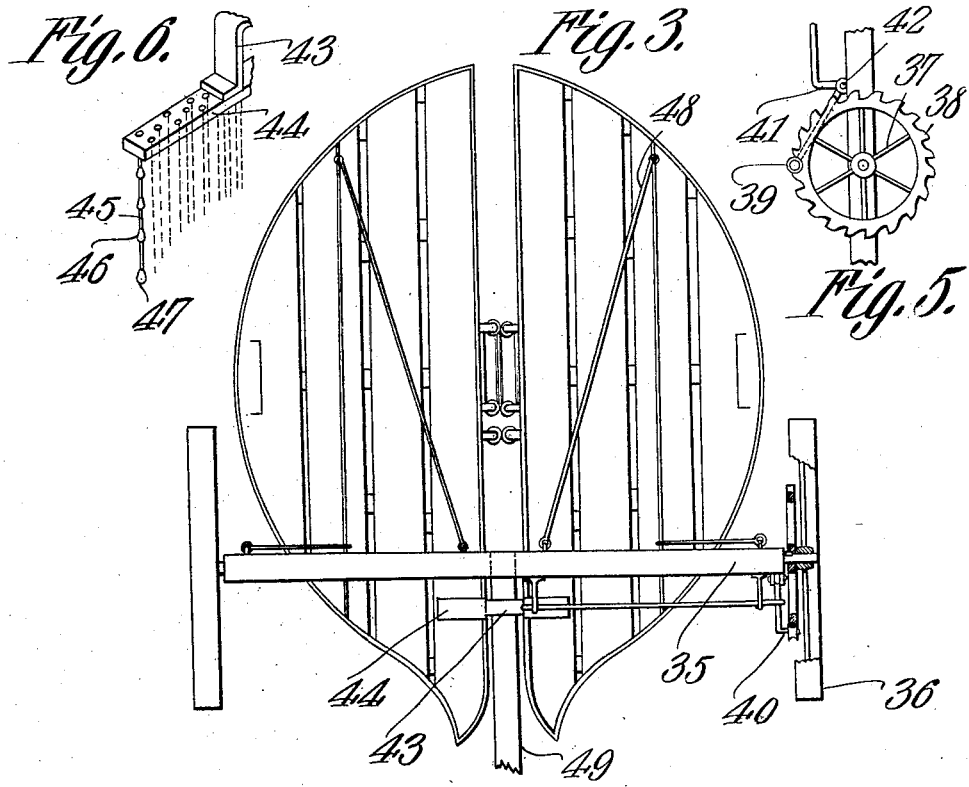
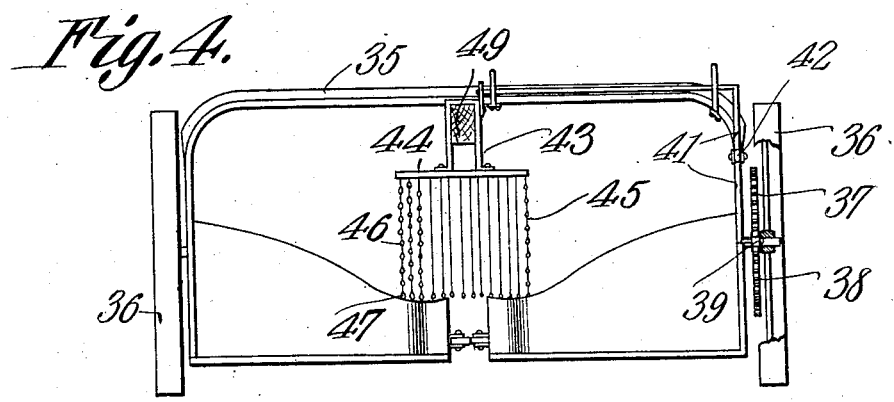
Witnesses
Inventor
Frank J. Shebester.
By C. A. Snow & Co.
Attorneys

UNITED STATES PATENT OFFICE.

FRANK J. SHEBESTER, OF LEBANON, OKLAHOMA.

INSECT-DESTROYER.

No. 915,121.

Specification of Letters Patent.

Patented March 16, 1909.

Application filed April 30, 1908. Serial No. 430,144.

*To all whom it may concern:*

Be it known that I, FRANK J. SHEBESTER, a citizen of the United States, residing at Lebanon, in the county of Marshall and State of Oklahoma, have invented a new and useful Insect-Destroyer, of which the following is a specification.

This invention relates to machines for dislodging and entrapping boll weevils and like insects found upon cotton and other vegetable growths.

The object of the invention is to provide a machine which can be drawn along a row of plants and which will operate to automatically strike the plants successively so as to jolt the insects from them, the machine being so constructed that the insects will drop onto it and pass thereinto, the only means of exit leading to a removable tray or drawer.

Another object is to provide a machine of this character which can be used either separately or in connection with a cultivator or other agricultural machine.

With these and other objects in view the invention consists of certain novel features of construction and combinations of parts which will be hereinafter more fully described and pointed out in the claims.

In the accompanying drawings is shown the preferred form of the invention.

Figure 1:
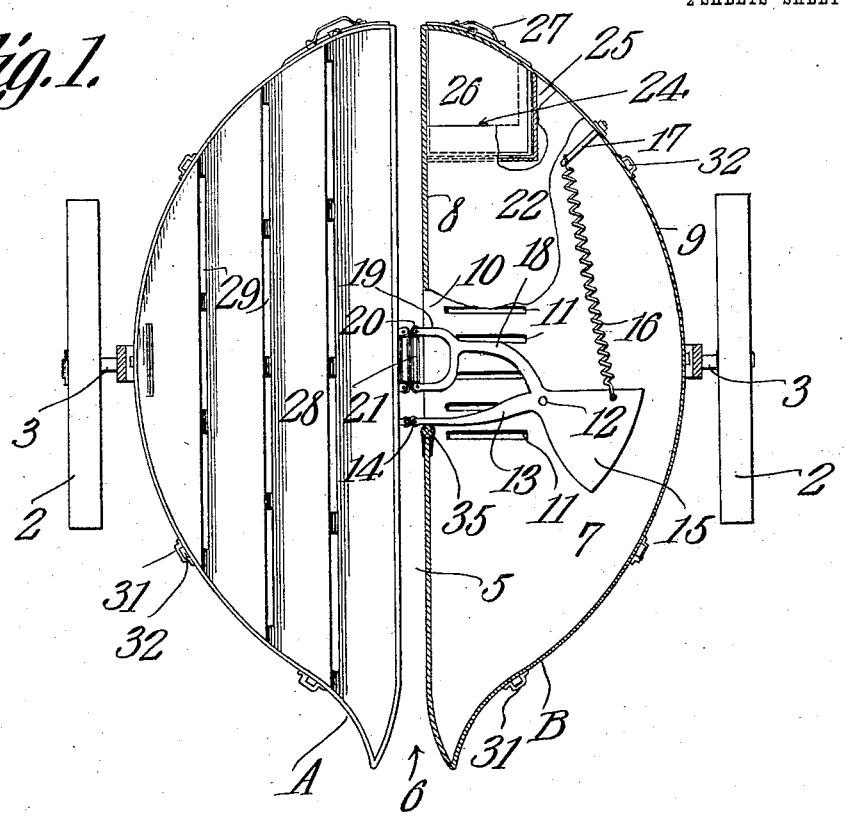
Figure 2:
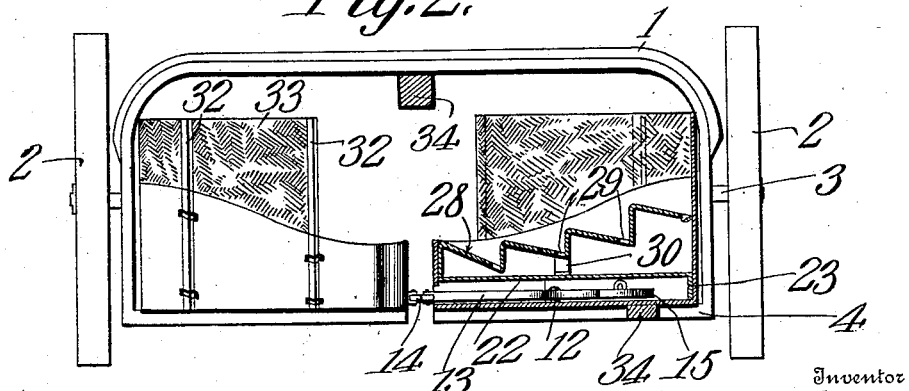

In said drawings:—Figure 1 is a view partly in plan and partly in horizontal section of a machine embodying the present improvements. Fig. 2 is a view partly in front elevation and partly in vertical section through said machine. Fig. 3 is a plan view of the trap attached to a cultivator frame, said frame being provided with a modified means for dislodging the insects. Fig. 4 is a front elevation of the parts shown in Fig. 3, the tongue of the machine being shown in section. Fig. 5 is a side elevation of the tappet wheel and the arm actuated thereby. Fig. 6 is a perspective view of a portion of the knocking head, one only of the cords being shown in full lines.

Referring to the figures by characters of reference, 1 designates an arched axle of any suitable proportions, there being wheels 2 mounted upon the end spindles 3 thereof while downwardly and inwardly extending hangers 4 are formed with or secured to the axle and constitute supports for the spaced traps constituting the body of the machine. The two traps are similar in construction and are spaced apart to form a central longitudinal channel 5 of sufficient width to receive the stalks of plants and the adjoining walls of the traps are flared or curved at their forward ends so that the front end of the channel is enlarged as indicated at 6.

The two traps have been indicated by the letters A and B and inasmuch as they are both of the same construction it is thought that a description of one will be sufficient for both.

The body of the trap is substantially semi-elliptical and consists of a bottom plate 7 the inner edge of which is straight for the greater part of its length while the other edge of the plate is curved. Both edges are provided with upstanding walls 8 and 9 respectively the wall 8 constituting one of the walls of the channel 5 while the wall 9 has its upper edge curved upwardly from the ends of the wall 8 to a point adjacent the spindle 3. The forward ends of the two walls 8 and 9 are curved so as to produce the enlarged inlet end 6 of channel 5 heretofore referred to.

A longitudinal slot 10 is formed within the wall 8 preferably at the center thereof and formed within the bottom 7 adjacent this slot are outlet slots 11. Pivotally mounted upon the bottom 7 as indicated at 12 is a trip arm 13 which extends through the slot 10 and has an anti-friction roller 14 at its outer end. A plate 15 is formed at the inner end of the arm 13 and a spring 16 connects this plate with an adjusting screw 17 engaging the wall 9 near one end thereof. Another arm 18 extends from the plate 15 and is forked as shown at 19, each finger of said fork normally projecting through the slot 10 and having a roller 20 thereon on which is mounted an endless belt 21 formed of leather or other suitable flexible material. These fingers are spaced apart a distance greater than the diameter of the largest stalks in the row to be operated upon. Plate 15 and its arms lie close to the bottom 7 and a horizontal partition 22 is supported thereover, the same being provided with a desired number of legs 23 whereby it is held properly spaced from the bottom of the body. An angular opening 24 is formed in the partition 22 at its rear end and is provided with depending flanges 25. A drawer 26 is insertible into an opening in the wall 9 at the rear end thereof and under the opening 24 and is designed to be limited and guided in its movements by the flanges 25.

It will be seen by referring to Fig. 1 that insects after dropping onto the partition 22 can not leave the same except by falling through the opening 24 and into the drawer 26. This drawer may be provided with a handle 27 whereby it can be conveniently opened and any suitable form of lock may be provided for holding the drawer in closed position.

Arranged above the partition 22 is a stepped cover 28 which fits snugly between the walls 8 and 9 and is made up of a series of longitudinally extending tiers or steps the base or tread portions of which are inclined downwardly and provided in their lowermost portions with longitudinal slots 29 of sufficient size to permit the insects to fall therethrough. This top plate is spaced from the partition 22 in any preferred manner as by means of legs 30. Brackets 31 may be secured upon the wall 9 and these are designed to receive standards 32 to which a shield 33 of canvas or other suitable material is fastened. This shield is designed to extend above the wall 9 and serves to prevent insects from being blown off of the top plate 28 after they have been deposited thereon. As shown in Fig. 1 a tongue 34 may be extended from the machine so that a draft animal can be harnessed thereto but it is to be understood that if preferred any suitable means may be provided for attaching this device to a cultivator.

The operation of this machine is based upon certain well known facts concerning the insects known as boll weevils. Although this insect is provided with wings it is commonly believed that it only flies twice during its existence, the first flight occurring immediately after the insect is hatched and the second flight occurring prior to laying its eggs. At other times the insect crawls slowly upon the ground or upon the plants and, if threatened in any way, it becomes still and has the appearance of being dead. If a plant containing these insects is shaken they will drop to the ground and remain still for some time. With the knowledge of these habits of the insect the advantages of the machine embodying the present invention will be apparent. When the machine is in operation the row of plants is designed to be received within the channel 5 between the two trap sections A and B and the stalks will successively contact with the rollers 14 on arms 13 and press them backward until they are released. This backward movement of the arms 13 will cause a corresponding movement of the arms 18 and as soon as arms 13 have been released the spring 16 will return them quickly to their initial positions and will swing arms 18 outwardly so that the belts 21 will strike the stalk and jolt it. The insects upon the stalk will thus be knocked from it and will fall onto the top plates 28. It will then roll down the inclined surface to the slots 29 and drop onto the partition 22. When they endeavor to escape from this partition 22 by crawling therefrom they will ultimately fall through the openings 24 and into the drawers 26. By removing the drawer of each section the insects can be destroyed in any preferred manner. By providing the slots 11 any trash which might accumulate within the lower portion of the machine will be free to drop therefrom, and inasmuch as the arms 13 and 18 operate above the slots they tend to keep them clear at all times. Importance is attached to the fact that the means utilized for striking the stalks consists of an endless flexible belt and therefore there is no danger of the bark upon the stalks becoming bruised. As shown in Fig. 1 a suitable cushion 35 formed of leather or other material may be arranged upon one end of each slot 10 and act as a stop for the arm 13.

In Figs. 3 to 6 inclusive, a modified means for dislodging the insects has been disclosed. This means is designed to be used when the trap is connected to the arched axle 35 of a cultivator or the like, or if preferred, this modified form of machine can be made complete in itself, the axle and supporting wheels constituting a part thereof. One of the wheels 36 on which the axle is mounted has a tappet wheel 37 secured to it and designed to rotate therewith, said wheel being provided with a series of outstanding teeth 38 designed to successively contact with and actuate a roller 39 mounted upon a finger 40 outstanding from one end of a bell-crank lever 41. This lever is fulcrumed, as at 42, upon the arched axle 35 and has an angular arm upstanding therefrom and extending in front of the axle to a loop 43 which embraces the tongue 49 and is attached to a head 44. This head is of any suitable length and has a number of cords or other flexible devices 45 depending loosely therefrom, each of said cords having a series of superposed knobs 46 of cork or other light material arranged thereon, there being a small weight 47 at the lower end of each cord so that the latter is maintained practically taut at all times. The trap, which is similar to the one heretofore described, may be connected to the axle by means of draw bars 48 or in any other suitable manner. When the same is drawn along a row of plants the rotating tappet wheel 37 will operate the roller 39 so as to oscillate the lever 41, and this will cause the loop 43 to move upwardly and downwardly relatively to the tongue 49 of the machine, and the weighted cords and the knobs thereon will be caused to brush over the plants and dislodge a greater portion of the insects which will thus drop into the trap. As the machine continues to advance the striking mechanism heretofore described will be brought into play and the remaining insects thus dislodged.

It is of course to be understood that the means herein described for brushing insects from the plants may be used, if desired, without the striking mechanism although it is preferred to combine the two. Also, if preferred, this brushing mechanism can be mounted upon one machine and the striking mechanism upon another and the two drawn successively along a row of plants.

Importance is attached to the use of the inclined steps 28 heretofore referred to, because when the insects strike the same they will, should they rebound, be deflected toward the guard 33 and thus prevented from escaping from the trap.

What is claimed is:

1. A machine of the character described comprising spaced movably supported collecting members, means carried by one of said members for successively striking plants received between the members, and means actuated by contact with plants for operating said striking members.

2. A machine of the character described comprising spaced movably supported collecting members, a tripping arm movably mounted within one of said members and disposed to be actuated by a plant received between the members, and spring controlled means for striking said plant upon its release from the tripping arm.

3. A machine of the character described comprising spaced collecting members, means carried thereby for shaking plants between said members and means operated by contact with plants for actuating said shaking means.

4. A machine of the character described comprising spaced movably supported collecting members, a tripping arm mounted within one of said members and disposed to be actuated by a plant between the members, and a spring actuated striking device movable with said arm to hit a plant when the latter is released from the arm, said device comprising spaced fingers, and a flexible device supported thereby.

5. A machine of the character described comprising spaced collecting members, a tripping arm projecting therebetween, and a spring controlled knocking device movable with the arm.

6. A machine of the character described comprising spaced collecting members, a tripping arm projecting therebetween, a spring controlled knocking device movable with the arm, and comprising a fork, and an endless belt movably mounted upon the fork and constituting striking surfaces.

7. A machine of the character described comprising movably supported spaced sections, a stepped top plate upon each section having inclined surfaces provided with discharge openings, plant shaking means carried by the sections a partition below each top plate and having an opening therein, and a removable receiver below said opening.

8. A machine of the character described comprising movably supported spaced sections, a stepped top plate upon each section having inclined surfaces provided with discharge openings, a partition below each top plate and having an opening therein, a removable receiver below said opening, and means projecting between the sections for automatically shaking plants between the sections.

9. A machine of the character described comprising spaced sections, means for movably supporting the same, means within and projecting between the sections for automatically striking plants therebetween, means operated by contact with said plants for actuating the striking means, and a stepped apertured top plate upon each section for receiving insects and directing them into the section, the steps of said plate being inclined.

10. A machine of the character described, comprising spaced collecting members, weighted flexible means for brushing plants between the members, and transversely movable means carried by said members for automatically jolting said plants subsequent to being brushed.

11. A machine of the character described comprising spaced collecting members for receiving plants therebetween, weighted series of flexibly connected knobs operated by the movement of the machine for brushing the plants between the collecting members, means for automatically striking the plants subsequent to the brushing operation, and means operated by contact with the plants for actuating said striking means, said members being positioned to receive insects dislodged by the brushing and striking operations.

In testimony that I claim the foregoing as my own, I have hereto affixed my signature in the presence of two witnesses.

FRANK J. SHEBESTER.

Witnesses:
J. A. Epper,
J. B. Everett.